United States Patent
Colahan et al.

(10) Patent No.: US 10,389,150 B2
(45) Date of Patent: Aug. 20, 2019

(54) SINGLE PIECE CASE WITH A BATTERY AND A HINGE

(71) Applicant: Apple Inc., Cupertino, CA (US)

(72) Inventors: Ian P. Colahan, Mountain View, CA (US); Darshan R. Kasar, San Francisco, CA (US); Timothy J. Rasmussen, Sunnyvale, CA (US); John J. Baker, Cupertino, CA (US); Shannon X. Yang, Sunnyvale, CA (US); Benjamin A. Cousins, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/656,593

(22) Filed: Jul. 21, 2017

(65) Prior Publication Data
US 2017/0324261 A1    Nov. 9, 2017

Related U.S. Application Data

(63) Continuation of application No. 14/815,352, filed on Jul. 31, 2015, now Pat. No. 9,735,595.

(51) Int. Cl.
*H02J 7/00* (2006.01)
*H04B 1/3888* (2015.01)
(Continued)

(52) U.S. Cl.
CPC .......... *H02J 7/0045* (2013.01); *H02J 7/0044* (2013.01); *H02J 7/0047* (2013.01); *H02J 7/0054* (2013.01);
(Continued)

(58) Field of Classification Search
CPC ... H02J 7/0045; H04B 1/3888; H04B 1/3883; H04M 1/185
(Continued)

(56) References Cited

U.S. PATENT DOCUMENTS

| 8,616,422 | B2 | 12/2013 | Adelman |
| 8,636,183 | B1 | 1/2014 | Steiner |
| (Continued) | | | |

FOREIGN PATENT DOCUMENTS

| CN | 102902308 A | 1/2013 |
| CN | 202653418 U | 1/2013 |
| (Continued) | | |

OTHER PUBLICATIONS

Chinese Patent for Utility Model No. ZL201621061349.7—Evaluation Report (UMPER) dated Feb. 27, 2017.
(Continued)

*Primary Examiner* — Ayodeji O Ayotunde
(74) *Attorney, Agent, or Firm* — Dickinson Wright RLLP

(57) ABSTRACT

An accessory device for an electronic device is disclosed. The accessory device may include a unitary body having a first region, a second region, and a hinge positioned between the first region and the second region. When a force is applied to the first region, the first region may bend or pivot at the hinge. When bent, the first region allows the electronic device to slide into or out of the accessory device. Further, the electronic device may slide into or out of the accessory device in a straight or linear manner. Also, the accessory device may further include a power supply designed to supply electrical current to a battery of the electronic device. The accessory device may further include a connector that electrically connects the power supply with the electronic device. The sliding motion of the electronic device prevents the connector from damage by bending.

20 Claims, 14 Drawing Sheets

(51) Int. Cl.
*H04B 1/3883* (2015.01)
*H04M 1/18* (2006.01)
*H04M 1/725* (2006.01)
*H02J 7/02* (2016.01)

(52) U.S. Cl.
CPC ......... *H04B 1/3883* (2013.01); *H04B 1/3888* (2013.01); *H04M 1/185* (2013.01); *H02J 7/025* (2013.01); *H02J 2007/005* (2013.01); *H04M 1/72527* (2013.01)

(58) Field of Classification Search
USPC ....................................................... 455/575.8
See application file for complete search history.

(56) References Cited

U.S. PATENT DOCUMENTS

| | | | |
|---|---|---|---|
| 9,195,272 | B2 | 11/2015 | O'Brien |
| 9,548,617 | B2 | 1/2017 | Toh |
| 2009/0283184 | A1 | 11/2009 | Han |
| 2010/0203931 | A1 | 8/2010 | Hynecek |
| 2012/0088558 | A1* | 4/2012 | Song ............... H04M 1/18 455/575.1 |
| 2012/0112031 | A1 | 5/2012 | Gormick et al. |
| 2013/0032617 | A1* | 2/2013 | Adelman ............. A45F 5/00 224/191 |
| 2013/0331156 | A1 | 12/2013 | Lui |
| 2014/0152890 | A1 | 6/2014 | Rayner |
| 2014/0202899 | A1 | 7/2014 | Murchison et al. |
| 2015/0068935 | A1 | 3/2015 | Kay et al. |
| 2015/0141082 | A1* | 5/2015 | Ehrlich ............... H04B 1/3888 455/575.1 |
| 2015/0194833 | A1 | 7/2015 | Fathollahi |
| 2016/0134142 | A1* | 5/2016 | Murphy ............... H02J 7/0054 455/573 |
| 2016/0366997 | A1* | 12/2016 | Sirichai ............... A45C 11/00 |

FOREIGN PATENT DOCUMENTS

| | | |
|---|---|---|
| CN | 203661131 U | 6/2014 |
| CN | 204031239 U | 12/2014 |
| CN | 204031628 U | 12/2014 |
| CN | 204145577 U | 2/2015 |
| CN | 204206256 U | 3/2015 |
| CN | 204273521 U | 4/2015 |
| KR | 100848786 B1 | 7/2008 |
| KR | 1020110001000 A | 1/2011 |
| KR | 1020140029844 A | 3/2014 |
| WO | 2012074151 A1 | 6/2012 |
| WO | 2013061796 A | 5/2013 |
| WO | 2014073832 A2 | 5/2014 |

OTHER PUBLICATIONS

PCT Application No. PCT/US2016/044176—International Search Report and Written Opinion dated Nov. 3, 2016.
Chinese Application for Invention No. 201610829963.1—First Office Action dated Aug. 2, 2018.
European Patent Application 16833541.2—Supplemental European Search Report dated Jan. 7, 2019.
Japanese Patent Application No. 2018-504907—Office Action dated Jan. 25, 2019.

* cited by examiner

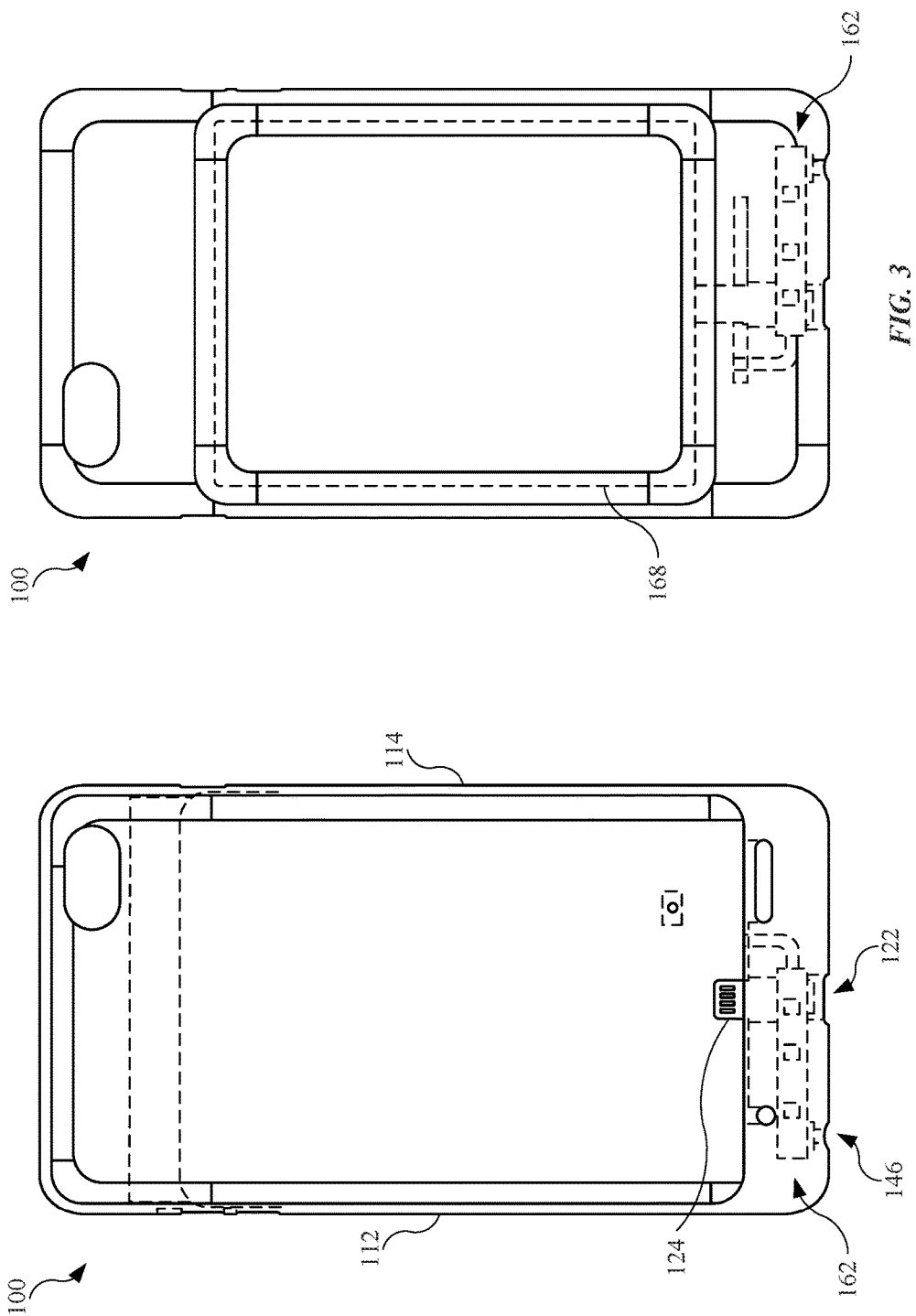

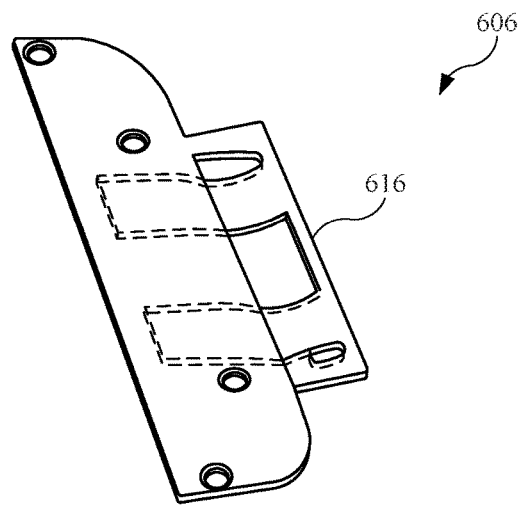
*FIG. 14*
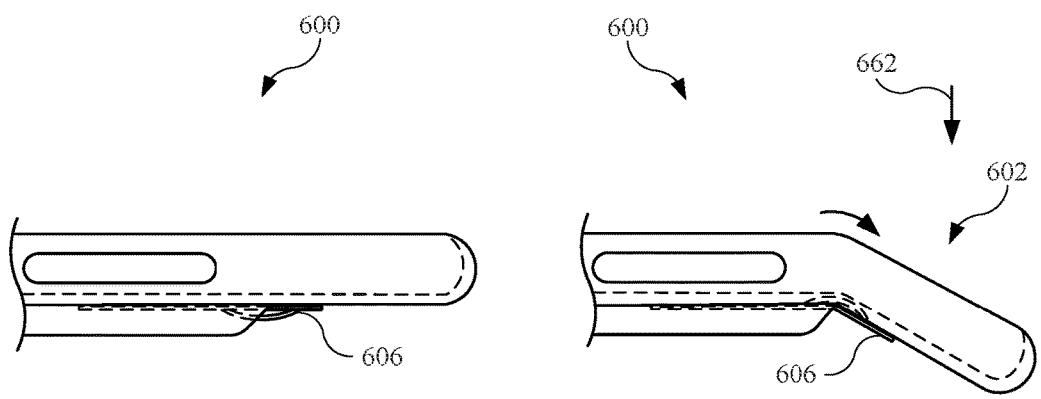
*FIG. 15*  *FIG. 16*

SINGLE PIECE CASE WITH A BATTERY AND A HINGE

CROSS-REFERENCE TO RELATED APPLICATIONS

The present application is a continuation of U.S. application Ser. No. 14/815,352, filed Jul. 31, 2015, entitled "SINGLE PIECE CASE WITH A BATTERY AND A HINGE", now U.S. Pat. No. 9,735,595 issued Aug. 15, 2017, the contents of which is incorporated herein by reference in its entirety for all purposes.

FIELD

The described embodiments relate generally to accessory devices. In particular, the present embodiments relate to a unitary accessory device having a hinge feature that allows the unitary accessory device to pivot and bend at the hinge feature allowing for insertion and extraction of an electronic device.

BACKGROUND

An accessory device for an electronic device is generally known in the art. Accessory devices can be used as a protective cover for the electronic device as well as provide an aesthetic appearance. Further, some accessory devices may include a power supply designed to provide electrical current to the electronic device. Also, typical accessory devices include at least one layer of material disposed across the entire accessory device. For example, a region of the accessory device designed to receive the electronic device may include a rigid polymeric material, such as plastic, disposed across the entire region. This offers a continuous, uniform protection to the electronic device.

In order to insert or extract the electronic device in a manner that does not damage the electronic device, a user is generally required to detach one structural feature of the accessory device from another structural feature. This allows for a straight insertion or extraction of the electronic device. However, an accessory device with two (or more) structural features may lead to losing or misplacing at least one of the structural features.

One solution may be to pull the electronic device from the accessory device at an angle. However, an angular extraction of an electronic device from an accessory device can lead to other issues. For example, when the accessory device includes the power source, a connector, or plug, must be inserted into the electronic device. The angular extraction causes a bending moment on the connector that may cause the connector to break off from the accessory device and remain inside the electronic device.

SUMMARY

In one aspect, a unibody accessory device suitable for use with an electronic device is described. The unibody accessory device may include a unitary structure having a size and a shape in accordance with the electronic device. The unitary structure may include a first region and a second region that combine to carry the electronic device. In some embodiments, the first region, in response to a force applied to the first region, pivots to allow an insertion event or an extraction event of the electronic device.

In another aspect, an accessory device suitable for use with an electronic device is described. The accessory device may include a first sidewall and a second sidewall that combine to retain the electronic device. The first sidewall may extend into a first region and a second region. The accessory device may further include a hinge feature hidden from view. The hinge feature may be positioned between the first region and the second region. The accessory device may further include a power supply. The accessory device may further include a connector disposed in the second region and configured to electrically connect the electronic device with the power supply. In some embodiments, the first region pivots at the hinge feature in response to a force applied to the first region to define a bent configuration of the first region with respect to the second region. Further, the bent configuration may allow the electronic device to be 1) inserted between the first sidewall and the second sidewall in a direction toward the connector, and 2) extracted from the first sidewall and the second sidewall in a direction away from the connector.

In another aspect, a method for forming a unibody accessory device having a hinge feature that facilitates an insertion event and an extraction event of an electronic device is described. The method may include securing a first region of the unibody accessory device with the hinge feature. The method may further include securing a second region of the unibody accessory device with the hinge feature. The method may further include forming a sidewall along the first region and the second region. In some embodiments, a force applied to the first region pivots at the hinge feature and bends the sidewall at the hinge feature to allow the insertion event or the extraction event.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which:

FIG. 2 illustrates a front view of the accessory device shown in FIG. 1;

FIG. 3 illustrates a rear view of the accessory device shown in FIG. 1;

FIG. 14 illustrates an isometric view of an alternate embodiment of a hinge feature suitable for use in an accessory device, in accordance with the described embodiments;

FIG. 15 illustrates a side view of an embodiment of an accessory device that includes the hinge feature shown in FIG. 14;

FIG. 16 illustrates a side view of the accessory device shown in FIG. 15, with a first region pivoting in response to a force applied to the first region;

Figure 1:
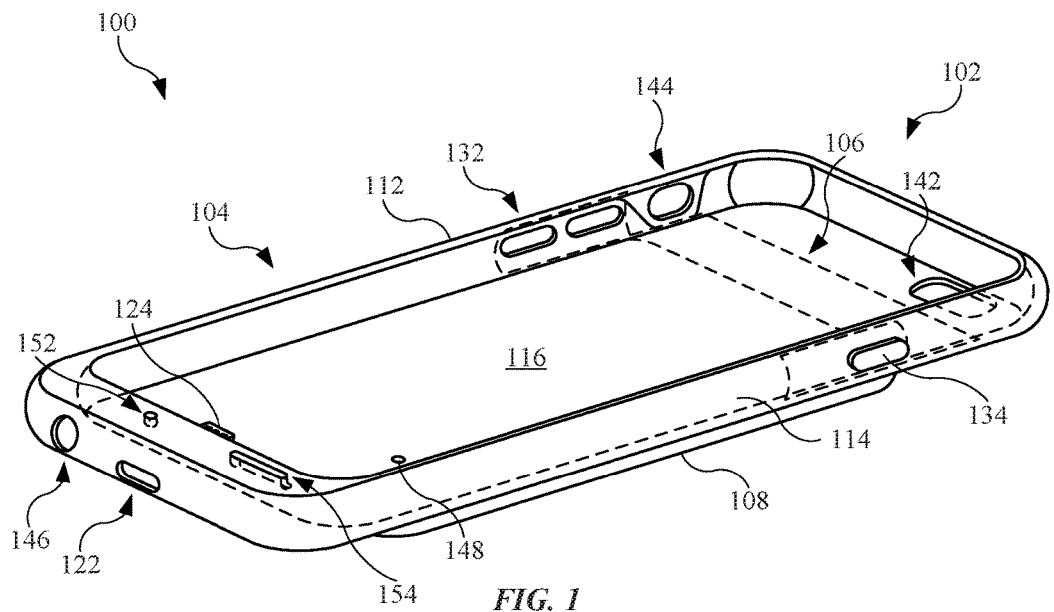
FIG. 1 illustrates an isometric view of an embodiment of an accessory device suitable for use with an electronic device, in accordance with the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an accessory device used with an electronic device. The accessory device may include a rigid shell formed from a polymeric material, such as a thermoplastic material. A molding process, such as compression molding or injection molding, may form the rigid shell. A relatively softer material, such as silicone, may surround the rigid shell. Further, the accessory device may include a hinge feature that allows the accessory device to pivot or bend in some locations of the accessory device. The hinge feature may be formed from a relatively flexible material, such as an elastomeric material. Also, the hinge feature may be formed in a manner such that the hinge feature is hidden from view to a user. This may be due in part to a molding process, and/or by an additional layer, such as a fabric layer (including microfiber), overlaying the hinge feature. The hinge feature is designed to allow for insertion of the electronic device into the accessory device, as well as extraction of the electronic device from the accessory device.

Further, the accessory device may include a first region and a second region. In some embodiments, the first region is generally associated with a region that secures an uppermost region of the electronic device, and the second region is generally associated with a region that secures a region other than the uppermost region of the electronic device. The first region and the second region may include several sidewalls designed to retain the electronic device. The hinge feature may be positioned between the first region and the second region. In this manner, the first region, for example, may pivot at the hinge feature and the electronic device can slide into or out of the accessory device.

The hinge feature offers several advantages. For example, in some embodiments, the sidewalls include a rigid polymeric material (or materials) designed to enhance structural support of the electronic device. In these embodiments, the sidewalls do not easily bend and accordingly, insertion or extraction of the electronic device via the sidewalls should be avoided. However, the hinge feature allows the first region to pivot out of the way during an insertion event or an extraction event, and the electronic device can slide into or out of the electronic device, respectively, with relative ease. Once the electronic device is into or out of the accessory device, the first region can bend or pivot back to its original or initial position and cover a portion of the electronic device.

In addition, the hinge feature allows for a unitary or unibody accessory device. In other words, when fully assembled, the accessory device including the hinge feature is not designed to include two or more separable parts or components. Traditional accessory devices may include multiple, separable components which increases the risk of losing or misplacing one or more of the separable components.

Further, in some embodiments, the accessory device includes a power source, or battery, designed to provide electrical current to a battery of the electronic device and increase a charge level, or battery power level, of the battery. In order to supply electrical current, the accessory device may include a connector, or plug, designed to electrically connect the power source with the electronic device, and in particular, the battery. If the electronic device is inserted into or extracted from the electronic device at an angle greater than zero, the electronic device may impose a bending moment to the connector causing damage to the connector or even breaking the connector off inside the electronic device. However, the hinge feature allows the first region to bend or pivot (in a manner previously described) and allows the electronic device to enter or exit from the accessory device without providing a bending moment to the connector. In other words, the electronic device may slide between the sidewalls directly toward or away from the connector at an angle of approximately zero with respect to the connector. Alternatively, this may be characterized as the electronic device being inserted into or extracted from the accessory device in a direction approximately parallel to the accessory device or one or more features of the accessory device, such as the hinge feature or the power supply of the accessory device.

Although the hinge feature is described as including an elastomeric material, several other materials designed to bend or flex in response to a force may be used. For example, the hinge feature may include a metal hinge feature for additional support. Also, in some embodiments, the metal hinge feature is designed to bend into two positions, one of which may be associated with a bent or pivoted configuration of the first region allowing movement of the electronic device relative to the accessory device. In some embodiments, the hinge feature includes interlocking pieces designed to fit like a puzzle piece. For example, the first region may include a first piece that mates with a second piece in a location associated with the hinge feature. The first region may be designed to receive a force that decouples the first piece with the second piece. The first region may then receive an additional force that pivots the first region to allow the electronic device to be inserted into or extracted from the accessory device.

Also, in order to further prevent damage to the connector and/or electronic device, the accessory device may further include a second hinge feature located proximate to the connector. This allows the connector to pivot with the electronic device.

Still, the accessory device may include other means for inserting and extracting the electronic device. For example, the first region of the accessory device, corresponding to the uppermost region of the electronic device, may include several small cuts or slits in a rigid shell. This allows for additional movement of the accessory device proximate to the small cuts. However, the small cuts are hidden from view by a layer (for example, silicone) molded over the small cuts.

These and other embodiments are discussed below with reference to FIGS. 1-25. However, those skilled in the art will readily appreciate that the detailed description given herein with respect to these Figures is for explanatory purposes only and should not be construed as limiting.

FIG. 1 illustrates an isometric view of an embodiment of an accessory device 100 suitable for use with an electronic device (not shown), in accordance with the described embodiments. As shown, the accessory device 100 includes a first region 102 and a second region 104. The first region 102 may be designed to receive an uppermost region of an electronic device, and the second region 104 may be designed to receive a remaining region (or regions) of the electronic device. Accordingly, the first region 102 and the second region 104 can combine to define a receptacle region that carries the electronic device. Also, the accessory device 100 may further include a hinge feature 106 positioned between the first region 102 and the second region 104. A fabric layer, such as a microfiber layer, may overlay the hinge feature 106 (shown as dotted lines) and the hinge feature 106 is hidden from view. In some embodiments, the hinge feature 106 is formed form a metal. In the embodiment shown in FIG. 1, the hinge feature 106 includes an elastomeric material designed to allow the first region 102, in response to a force applied to the first region 102, to pivot or bend at the hinge feature 106 and allow the electronic device to slide into or out of the accessory device 100. Also, the accessory device 100 may include several sidewalls, such as a first sidewall 112 and a second sidewall 114 opposite the first sidewall 112, designed to further retain the electronic device. Both the first sidewall 112 and the second sidewall 114 may extend along the first region 102 and the second region 104. Also, when the first region 102 pivots at the hinge feature 106, an electronic device may slide between a portion of the first sidewall 112 and the second sidewall 114 (corresponding to the second region 104) so that the electronic device may be inserted into or extracted from the accessory device 100. This will be described and shown in detail below.

The accessory device 100 may further include a power supply disposed in a rear portion 108 of the accessory device 100. In some embodiments, the power supply includes one or more battery cells designed to retain an electrical charge. The accessory device 100 includes a port 122 designed to receive a connector that, when coupled to a power source (such as an electrical outlet, not shown), provides electrical current in order to charge the power supply. The accessory device 100 further includes a connector 124, or port, designed to electrically connect the electronic device with the power supply. In this manner, the power source can recharge a battery in the electronic device when the electronic device is electrically coupled with the connector 124.

Also, as shown, the hinge feature 106 is designed to extend into both the first sidewall 112 and the second sidewall 114. This may allow for greater stability for the hinge feature 106. However, in other embodiments, the hinge feature 106 is disposed only on a base portion 116 of the accessory device 100. Also, in some embodiments, the hinge feature 106 extends through the sidewalls in a location proximate one or more protruding features, such as a first protruding feature 132 and a second protruding feature 134. The protruding features are designed to align with input features, or buttons, of the electronic device such that when a force is applied to a protruding feature, a button corresponding to the protruding feature is depressed to input a gesture to the electronic device.

The accessory device 100 may further include several openings. For example, as shown in FIG. 1, the accessory device 100 includes a first opening 142 designed to open to a camera and lens of the electronic device. Also, the accessory device 100 may further include a second opening 144 designed to open to an input feature, such as a switch, of the electronic device. Further, the accessory device 100 may include a third opening 146 designed to allow an input device, such as an audio headset, to electrically couple with the electronic device. Also, the base portion 116 of the accessory device 100 may include a fourth opening 148 designed to allow visible light from a light source, such as a light-emitting diode (LED) (not shown). The LED light may provide an indication of the charge level of the power source in the accessory device 100. For example, LED may emit green light when the power source is fully charged. Further, LED may switch to an orange, or amber, color when the power source is charging. The accessory device 100 may also include a fifth opening 152 and a sixth opening 154. The fifth opening 152 is designed to allow sound to travel to a microphone opening of an electronic device, while the sixth opening 154 is designed to allow sound to travel from an audio speaker of the electronic device.

Also, the accessory device 100 may be referred to as a unibody accessory device in that the accessory device 100, when fully assembled, does not include a part or component detachable with respect to another part or component.

FIG. 2 illustrates a front view of the accessory device 100 shown in FIG. 1. As shown, the hinge feature 106 extends across the accessory device 100 from the first sidewall 112 to the second sidewall 114. Also, the connector 124 may be electrically coupled with a power source using integrated circuits 162 disposed in the second region 104 and generally hidden from view. The integrated circuits 162 may further include one or more circuits to process electrical signals, such as data transmission or electrical power, from an electrical outlet electrically connected to the accessory device via the port 122. Further, the integrated circuits 162 may include one or more circuits to process electrical signals generated from a headset electrically connected to the accessory device 100 via the third opening 146. FIG. 3 illustrates a rear view of the accessory device 100 shown in FIG. 1. As show, the integrated circuits 162 are electrically coupled with the power source 168 disposed in a rear portion of the accessory device 100 such that the power source 168 is hidden from view.

Figure 4:
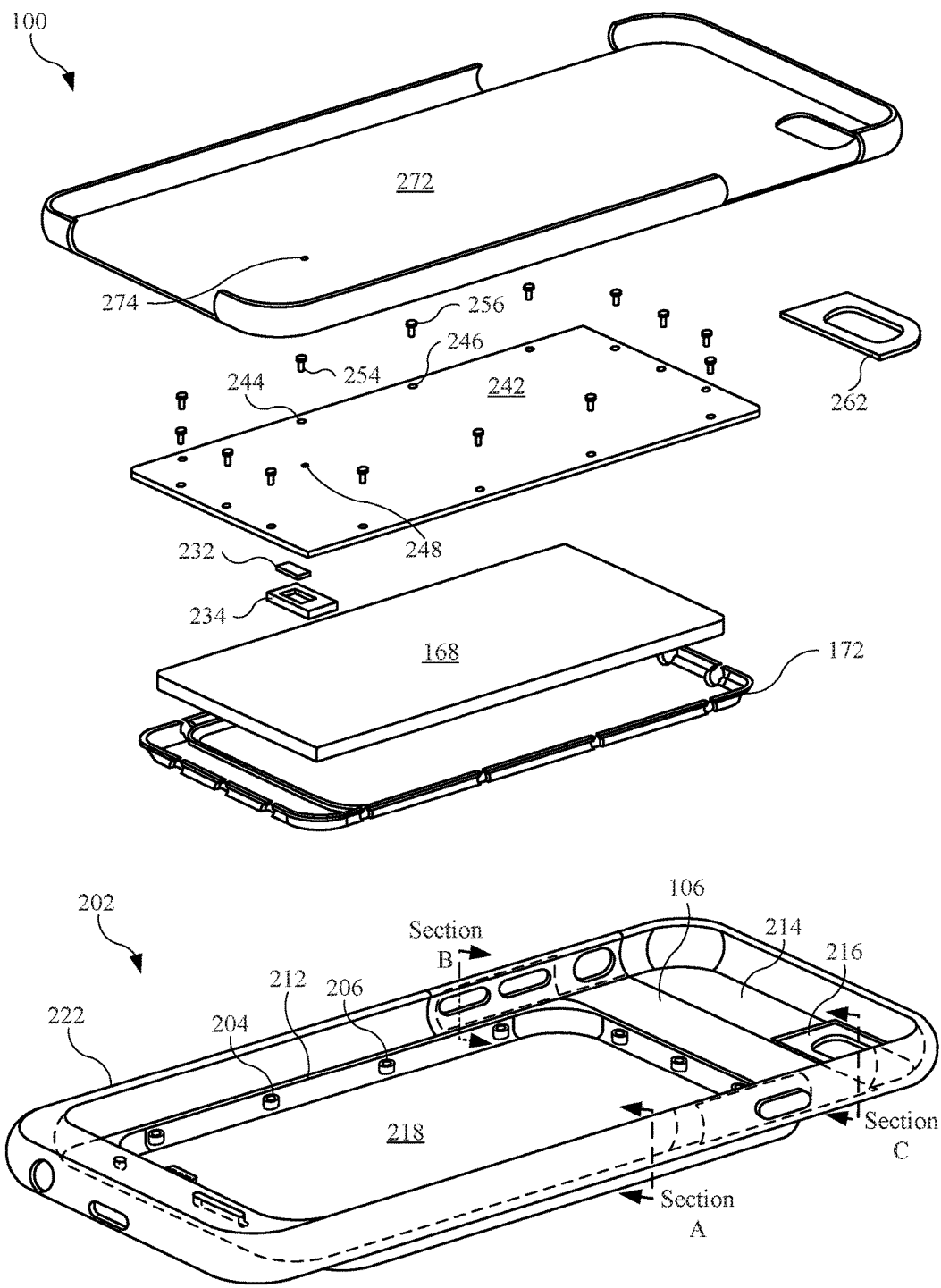
FIG. 4 illustrates an exploded view of the accessory device shown in FIG. 1.

FIG. 4 illustrates an exploded view of the accessory device 100 shown in FIG. 1. For purposes of simplicity, the integrated circuits previously described are not shown. The accessory device 100 may include a rigid layer 202 formed from a polymeric material, such as a plastic or thermoplastic. The rigid layer 202 generally defines the shape of the accessory device 100 and provides structural support to the accessory device 100. A molding process, such as compression molding or injection molding, both of which include a molding core and a mold cavity (not shown), may be used to form the rigid layer 202. As shown, the rigid layer 202 includes several fastener receptacles, such as a first fastener receptacle 204 and a second fastener receptacle 206. Each of the fastener receptacles is designed to receive a fastener that secures one or more components with the rigid layer 202.

However, the rigid layer 202 does not extend to all locations of the accessory device 100. For example, the hinge feature 106 previously described is located in a region generally not associated with the rigid layer 202. Accordingly, the hinge feature 106 may separate the rigid layer 202 into a first rigid portion 212 and a second rigid portion 214. Further, the hinge feature 106 may be made from a first material (such as an elastomeric material) and the rigid layer 202, which includes the first rigid portion 212 and the second rigid portion 214, may be made from a second material (such as a thermoplastic material) different from the first material. Also, as shown in FIG. 4, a soft layer 222 may surround and cover and exterior region of the rigid layer 202 and the hinge feature 106. In some embodiments, the soft layer 222 includes a silicone material over molded to the rigid layer 202.

Figure 5:
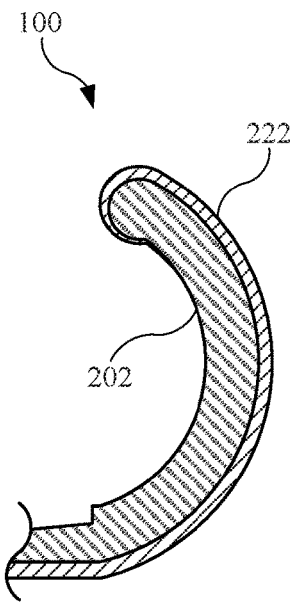
FIG. 5 illustrates a cross sectional view of the accessory device along Section A, shown in FIG. 4.
Figure 6:
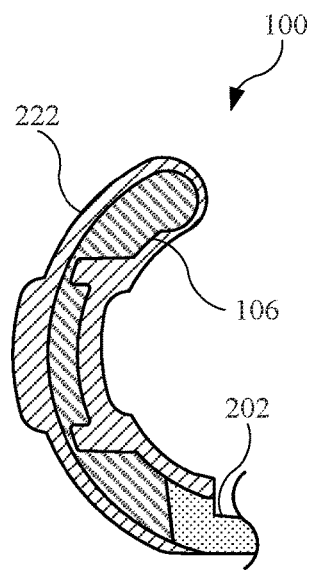
FIG. 6 illustrates a cross sectional view of the accessory device along Section B, shown in FIG. 4.
Figure 7:
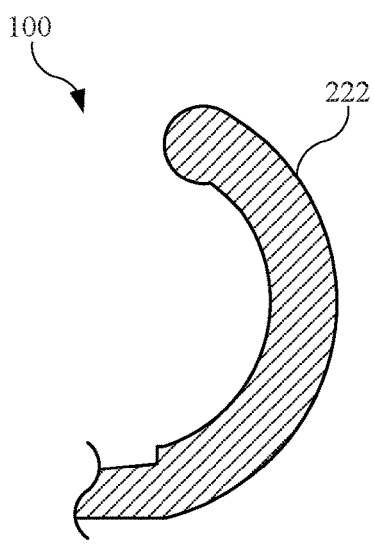
FIG. 7 illustrates a cross sectional view of the accessory device along Section C, shown in FIG. 4.

In some locations, the sidewalls include both the rigid layer 202 and the soft layer 222. For example, FIG. 5 illustrates a cross sectional view of the accessory device 100 along Section A, shown in FIG. 4. As shown, the soft layer 222 surrounds the rigid layer 202. However, in other locations, the sidewalls include only the material defining the hinge feature 106 and the soft layer 222. For example, FIG. 6 illustrates a cross sectional view of the accessory device 100 along Section B, shown in FIG. 4. As shown, the soft layer 222 surrounds the hinge feature 106. The rigid layer 202 terminates such that the hinge feature 106 and the soft layer 222 define the sidewall. In some embodiments, the material defining the hinge feature 106 is formed from an elastomeric material. Still, in other locations, the sidewalls include only the soft layer 222. For example, FIG. 7 illustrates a cross sectional view of the accessory device 100 along Section C, shown in FIG. 4, showing the sidewall made of only the soft layer 222. This allows for additional flexibility and bending of the accessory device 100, and in particular, bending of the sidewall.

Returning to FIG. 4, the accessory device 100 further includes a power source 168 disposed in an opening 218 (when the accessory device 200 is fully assembly) defined by the rigid layer 202. In some embodiments, the power source 168 includes a battery cell. A battery can 172 designed to provide protection to the power source 168 may surround the power source 168. The battery can 172 may include several openings, each of which is designed to receive a fastener and couple with a fastener receptacle of the rigid layer 202. Both the power source 168 and the battery can 172 are designed to fit into the opening 218 of the rigid layer 202 and accordingly, may be hidden from view due in part by the rigid layer 202, the soft layer 222, and the fabric layer 272 (discussed later). Also, the accessory device 100 may further include a light transmission feature 232 positioned in a block 234. The block 234 may be designed to receive the light transmission feature 232 and a light source, such as a light-emitting diode (not shown). In this manner, the light source may transmit light through the light transmission feature 232, which acts as a light guide panel, and the light transmission feature 232 allows the light to exit the accessory device 100 through one or more openings. The light source may indicate an electrical charge level of the power source 168. For example, the light source may emit, for example, a green color to denote "100 percent charge" of the power source. Alternatively, the light source may emit a different color, such as orange or amber, to denote the power source 168 is still charging.

The accessory device 100 may further include a lid feature 242 designed to cover and protect the power source 168. The lid feature 242 may include several openings, such as a first opening 244 and a second opening 246. Each of the openings is designed to receive a fastener that secures one or more components with the rigid layer 202. However, the lid feature 242 may further include an opening 248 aligned with the light transmission feature 232. Also, the accessory device 100 may include several fasteners, such as a first fastener 254 and a second fastener 256. Each of the fasteners is designed to extend through an (outer) opening of the lid feature 242, an opening of the battery can 172, and a fastener receptacle of the rigid layer 202.

The accessory device 100 may further include a camera trim 262 designed to provide an opaque layer. The camera trim 262 is located around an opening of the accessory device 100 (such as the first opening 142, shown in FIG. 1). In this manner, when an electronic device having a camera is installed in the accessory device 100, any unwanted light received during an image capture event using the camera may be blocked by the camera trim 262. The camera trim 262 may be disposed in a recessed portion 216 of the second rigid portion 214.

The accessory device 100 may further include a fabric layer 272 designed to provide a non-abrasive surface that does not scratch or damage an electronic device installed in the accessory device 100. In some embodiments, the fabric layer 272 includes a microfiber layer. The fabric layer 272 includes an opening 274 aligned with the opening 248 of the lid feature 242. This allows light to exit from the accessory device 100. The light may be visible to a user when an electronic device is not installed in the accessory device 100.

FIGS. 8-11 illustrate a process for extracting an electronic device 310 from an accessory device 300, in accordance with the described embodiments. The accessory device 300 may include any features previously described for an accessory device. Also, the electronic device 310 may be mobile communication device, such as a smartphone or a tablet device.

Figure 8:
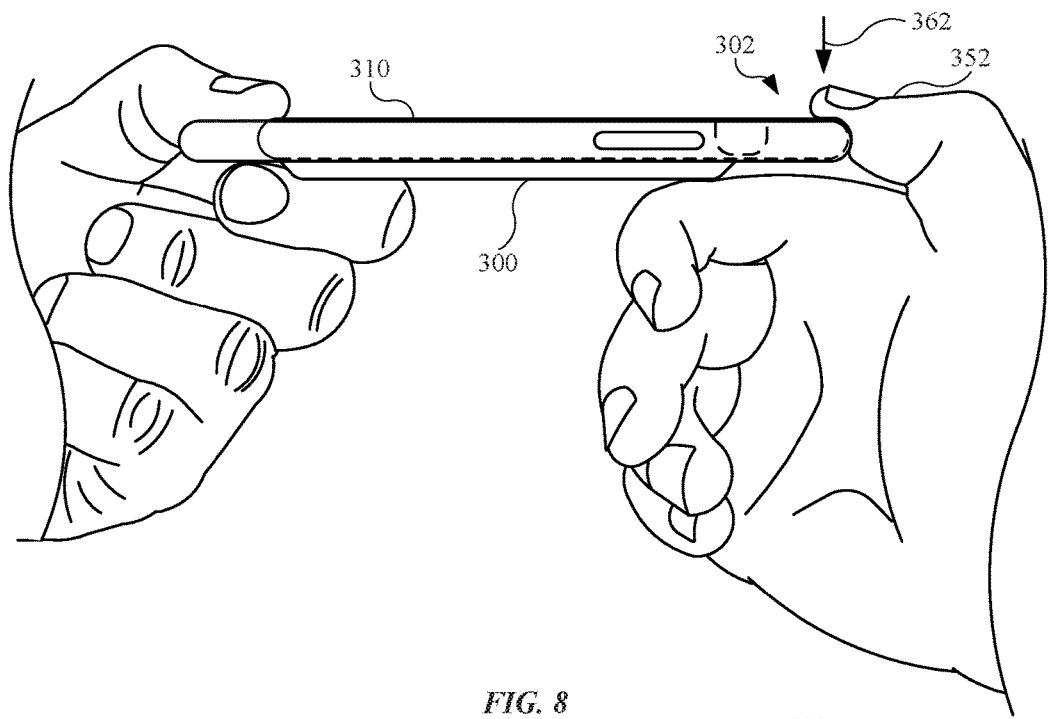
FIG. 8 illustrates a side view of the accessory device that includes an electronic device, showing a force applied to a first region of the accessory device.
Figure 9:
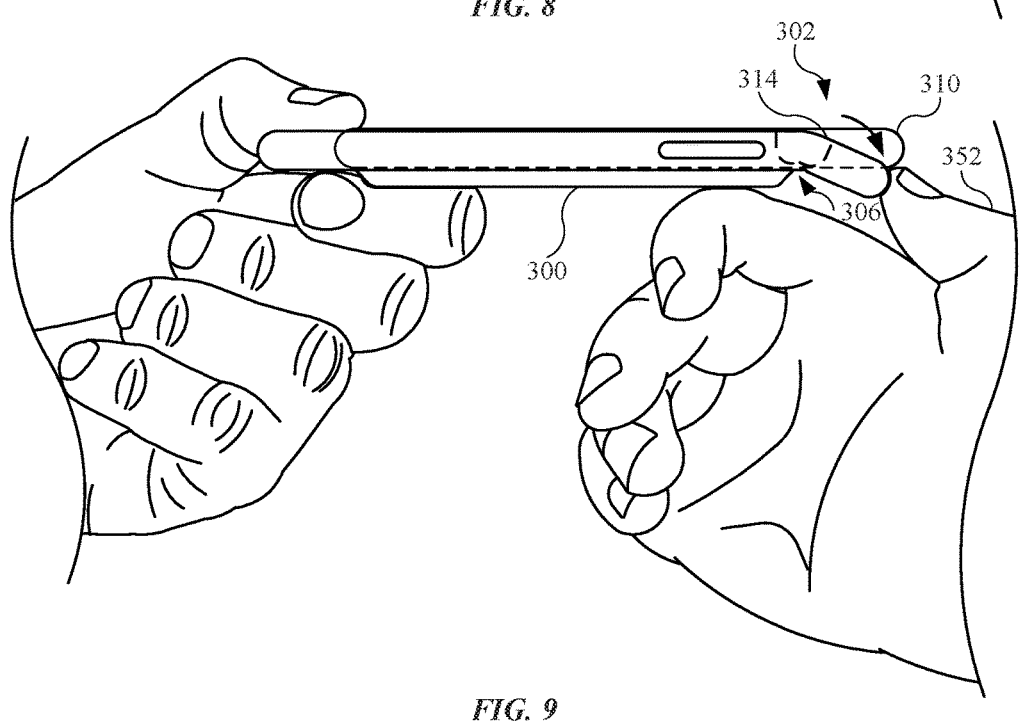
FIG. 9 illustrates a side view of the first region of the accessory device pivoting at a hinge feature within in the accessory device, with the first region bending in response to the force applied.
Figure 10:
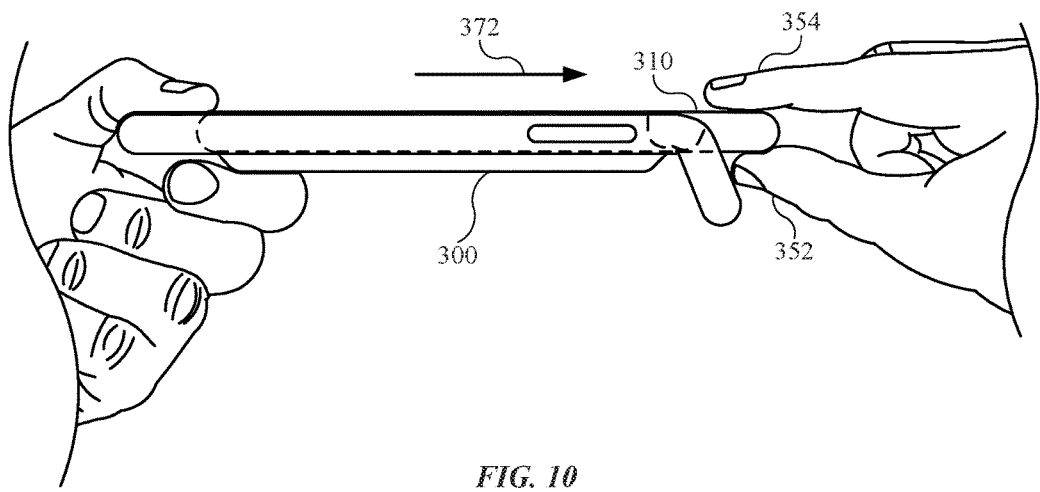
FIG. 10 illustrates a side view of the electronic device being removed from the accessory device in response to a second force.
Figure 11:
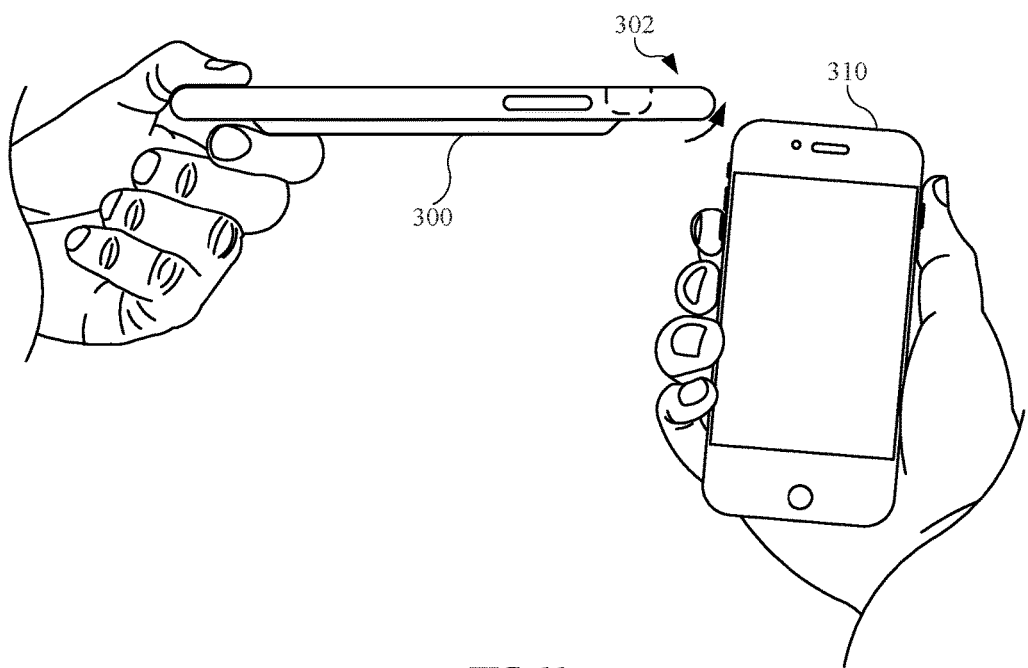
FIG. 11 illustrates a side view of the electronic device removed from the accessory device, with the first region returned to its initial position.

FIG. 8 illustrates a side view of the accessory device 300 that includes an electronic device 310, showing a force applied to a first region 302 of the accessory device 300. As shown, a thumb 352 of a user is capable of providing the force to the first region 302 generally in a direction denoted by an arrow 362. FIG. 9 illustrates a side view of the first region 302 of the accessory device 300 pivoting at a hinge feature 306 within in the accessory device 300, with the first region 302 bending in response to the force applied. As shown, with sufficient force supplied by the thumb 352, the first region 302 is removed from the electronic device 310. Also, a portion of the sidewalls located in the first region 302 may bend. For example, in FIG. 9, a portion of a sidewall 314 bends when the first region 302 pivots. FIG. 10 illustrates a side view of the electronic device 310 being removed from the accessory device 300 in response to a second force, denoted by an arrow 372. This may include the electronic device 310 being extracted from the sidewalls of the accessory device 300. The second force may be referred to an extraction force used to remove the electronic device 310 from the accessory device 300. As shown, the extraction force is provided by a thumb 352 and a finger 354 (of a user) grasping the electronic device 310 and pulling the electronic device away from the accessory device 300. Further, the arrow 372 denotes a straight or linear extraction of the electronic device 310, rather than an angled extraction (at an angle greater than zero). In this manner, the electronic device 310 does not provide a bending moment to any components of the accessory device, such as a connector 124 (shown in FIG. 1), and accordingly, does not cause damage to the accessory device 300. FIG. 11 illustrates a side view of the electronic device 310 removed from the accessory device 300, with the first region 302 returned to its initial position. The "initial position" may be referred as a straight or linear configuration.

It will be appreciated that a generally similar procedure may be used to insert the electronic device 310 into the accessory device 300. For instance, a force may be applied to the first region 302 followed by a force applied to the electronic device 310 in a direction opposite the arrow 372 (shown in FIG. 10) to insert the electronic device 310 into the accessory device 300.

Figure 12:
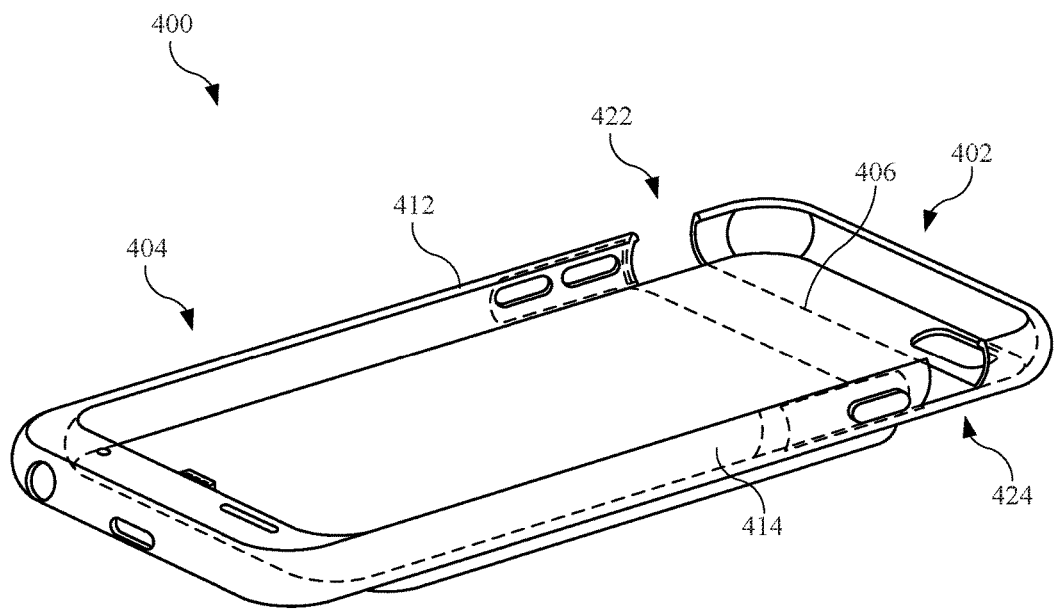
FIG. 12 illustrates an isometric view of an alternate embodiment of an accessory device having openings in the sidewalls, in accordance with the described embodiments.

FIG. 12 illustrates an isometric view of an alternate embodiment of an accessory device 400 having openings in the sidewalls, in accordance with the described embodiments. For example, the accessory device 400 may include a first sidewall 412 having a first opening 422 and a second sidewall 414 having a second opening 424. The first opening 422 and the second opening 424 may allow a first region 402 to pivot or bend with respect to a second region 404. In some embodiments, a hinge feature 406 is included. In addition to these features, the accessory device 400 may include any features previously described for an accessory device.

Figure 13:
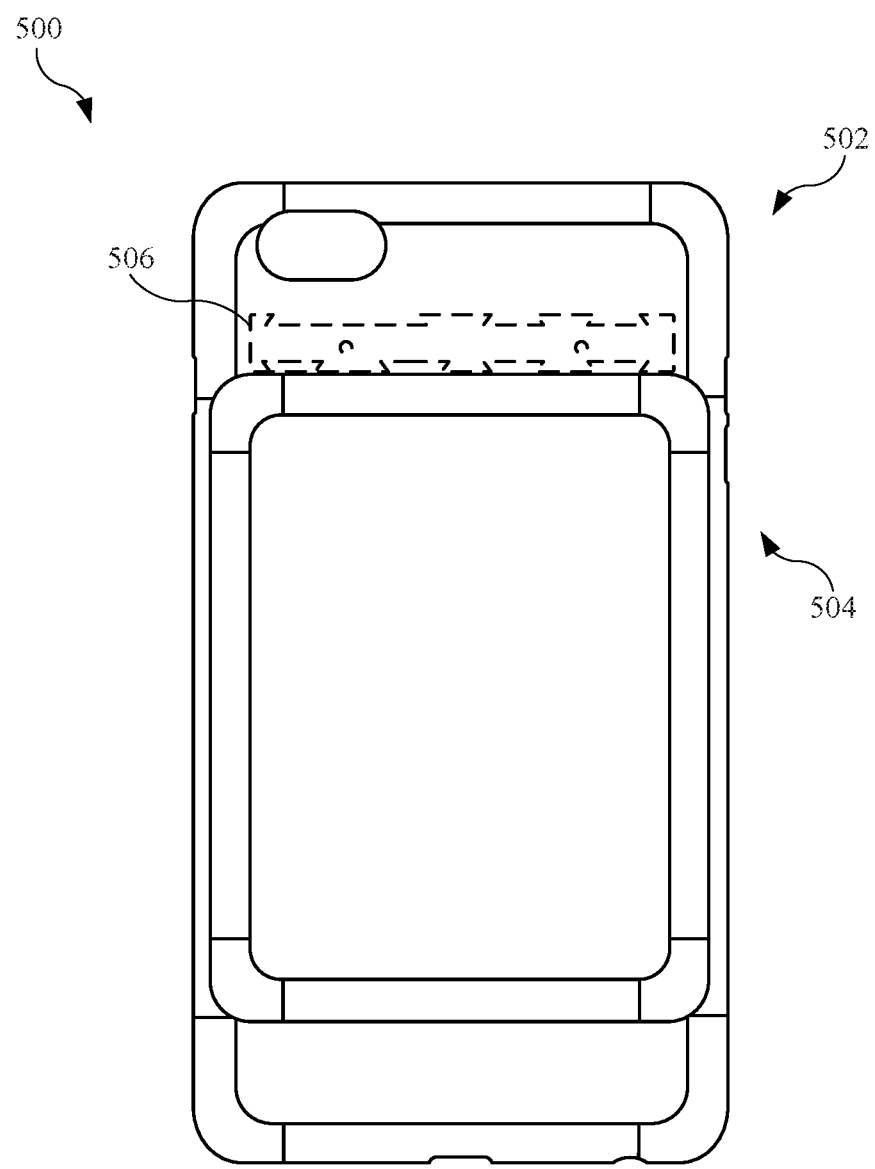
FIG. 13 illustrates a rear view of an alternate embodiment of an accessory device having a hinge feature formed from a metal, in accordance with the described embodiments.

FIG. 13 illustrates a rear view of an alternate embodiment of an accessory device 500 having a hinge feature 506 formed from a metal, in accordance with the described embodiments. As shown, the hinge feature 506 is embedded in one or more layers of the accessory device 500. The hinge feature 506 allows a first region 502 to pivot or bend with respect to a second region 504, in order to insert or extract an electronic device in a manner previously described. In addition to these features, the accessory device 500 may include any features previously described for an accessory device.

FIG. 14 illustrates an isometric view of an alternate embodiment of a hinge feature 606 suitable for use in an accessory device, in accordance with the described embodiments. In some embodiments, the hinge feature 606 is formed from a metal. The hinge feature 606 is capable of bending from a first position (shown in FIG. 14) to a second position (not shown) by applying a force to a wing feature 616 of the hinge feature 606. In this regard, the hinge feature 606 may be referred to as a "bi-stable hinge" in that the first position and the second position of the wing feature 616 define two stable positions of the hinge feature 606.

FIG. 15 illustrates a side view of an embodiment of an accessory device 600 that includes the hinge feature 606 shown in FIG. 14. As shown, the hinge feature 606 is in the first position. However, FIG. 16 illustrates a side view of the accessory device 600 shown in FIG. 15, with a first region 602 pivoting in response to a force applied to the first region 602. The force is applied in a direction denoted by an arrow 662. The hinge feature 606 is in the second position, and an electronic device (not shown) may be inserted into or extracted from the accessory device 600.

Figure 17:
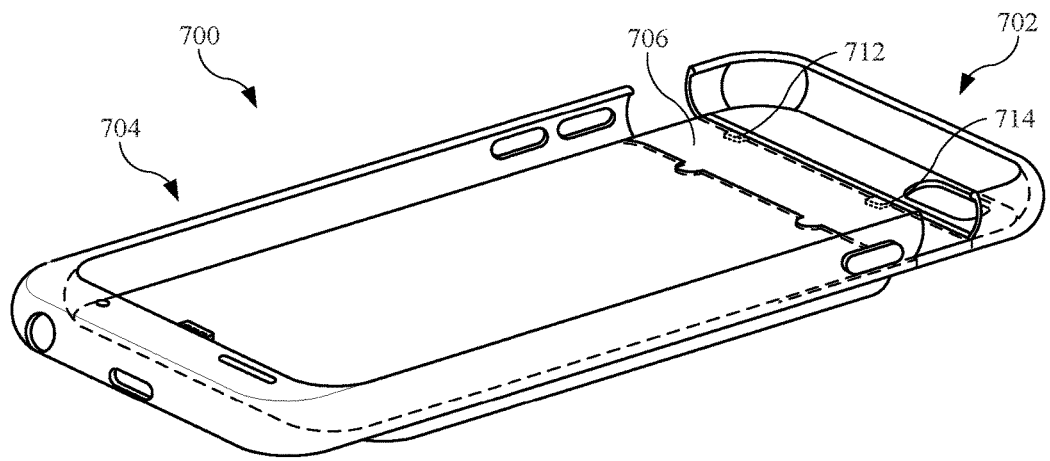
FIG. 17 illustrates an isometric view of an alternate embodiment of an accessory device having an alternate embodiment of a hinge feature, in accordance with the described embodiments.

FIG. 17 illustrates an isometric view of an alternate embodiment of an accessory device 700 having an alternate embodiment of an interlocking feature 706, in accordance with the described embodiments. The fabric layer is removed for purposes of illustration. As shown, the interlocking feature 706 may couple a first region 702 with a second region 704. The first region 702 may include a first extension 712 and a second extension 714, both of which are inserted into and interlocked with the interlocking feature 706. However, the extensions are designed to decouple with the interlocking feature 706.

Figure 18:
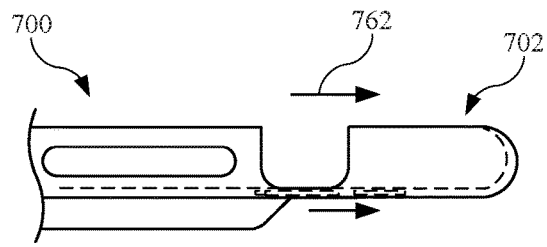
FIG. 18 illustrates a side view of an embodiment of an accessory device that includes the hinge feature shown in FIG. 17.
Figure 19:
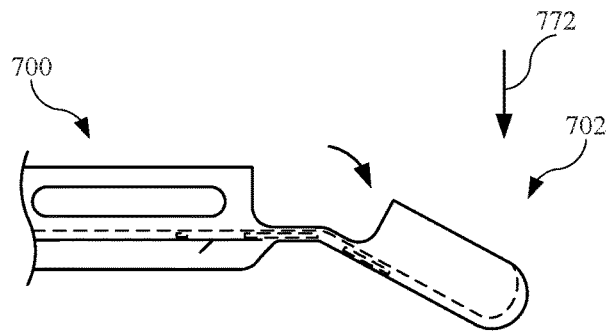
FIG. 19 illustrates a side view of the accessory device shown in FIG. 18, with a first region bending in response to a second force applied to the first region.

FIG. 18 illustrates a side view of an embodiment of an accessory device 700 that includes the interlocking feature 706 shown in FIG. 17. As shown, when a force is applied to the first region 702 in a direction of an arrow 762, the first extension 712 and the second extension 714 (shown in FIG. 17) disengage from the interlocking feature 706. FIG. 19 illustrates a side view of the accessory device shown in FIG. 18, with a first region 702 bending in response to a second force applied to the first region 702. The second force may be in a direction of an arrow 772. In this position, the accessory device 700 is capable of receiving an electronic device, or the accessory device 700 may allow the electronic device to be removed.

Figure 20:
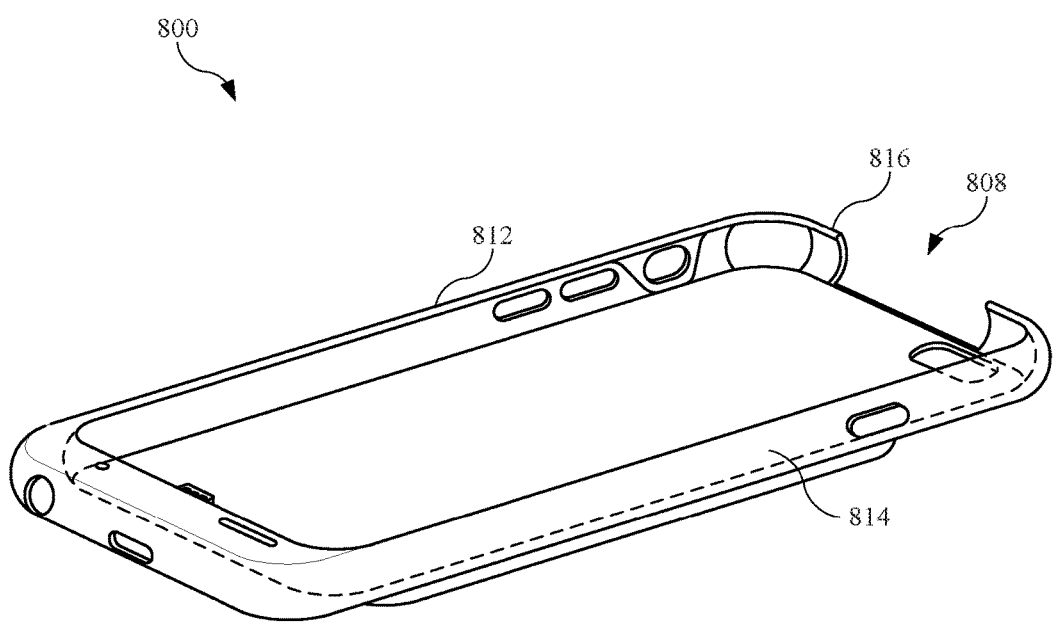
FIG. 20 illustrates an isometric view of an alternate embodiment of an accessory device having an opening in a sidewall.

FIG. 20 illustrates an isometric view of an alternate embodiment of an accessory device 800 having an opening 808 in a sidewall 816. This may allow other sidewalls, such as a first sidewall 812 and/or a second sidewall 814 to bend or flex to allow an electronic device (not shown) to be inserted into or extracted from the accessory device 800.

Other embodiments (not shown) may be used. For example, an accessory device previously described may include a first hinge feature and a second hinge feature. The second hinge feature may be located proximate to a connector (such as a connector 124, shown in FIG. 1). This allows for additional flexibility and reduces the likelihood of damage to the accessory device or an electronic device. Further, a sidewall in a first region (such as the first region 102, shown in FIG. 1) may include several cuts or slights in a rigid portion (such as the second rigid portion 214, show in FIG. 4). The cuts may be hidden from view by a soft layer (such as the soft layer 222, show in FIG. 4). This allows a sidewall in the first region to include additional flexibility to allow an electronic device (not shown) to be inserted into or extracted from the accessory device.

The previous embodiments describe an accessory device having a connector designed to engage an opening in an electronic device in order to provide power to and charge a battery in the electronic device. This is generally referred to a "wired charging" configuration. However, several alternate techniques may be used to charge the accessory device as well as the electronic device without the wired charging configuration.

Figure 21:
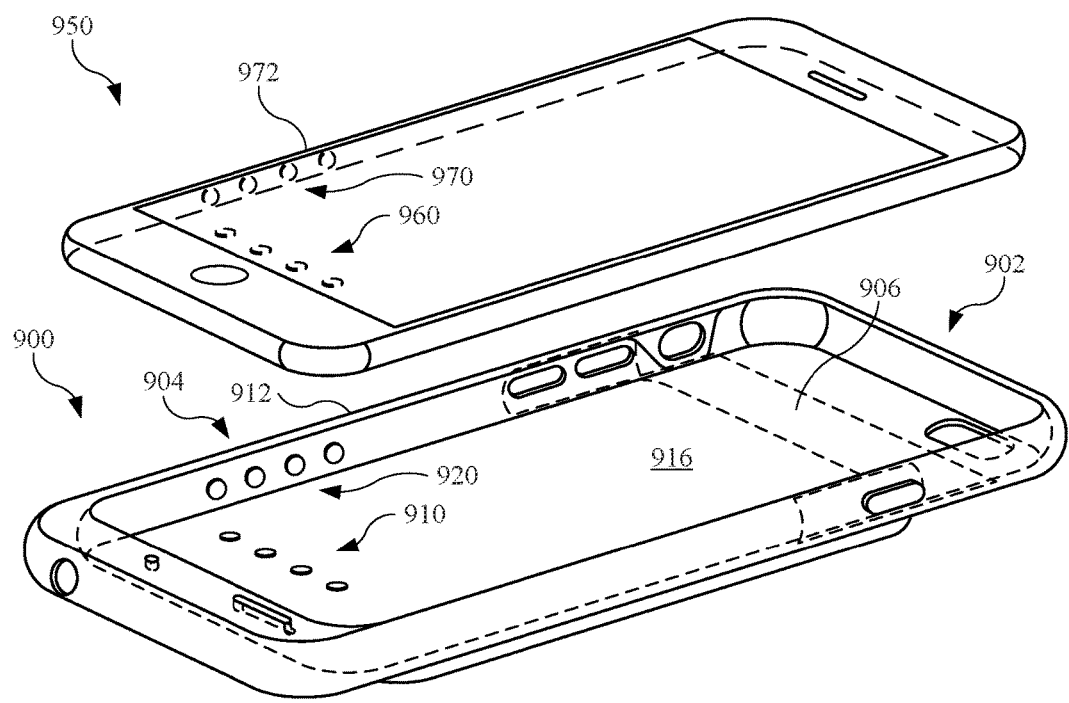
FIG. 21 illustrates an isometric view of an alternate embodiment of an electronic device and accessory device suitable for use with charging the electronic device, in accordance with the described embodiments.

For example, FIG. 21 illustrates an isometric view of an alternate embodiment of an electronic device 950 and accessory device 900 suitable for use with charging the electronic device 950, in accordance with the described embodiments. The accessory device 900 may include metal contacts designed to engage metal contacts of the electronic device 950. For example, the accessory device 900 may include first metal contacts 910 disposed on a base portion 916 of the accessory device 900. The electronic device 950 may include first metal contacts 960 disposed on a rear portion of the electronic device 950 and designed to engage the first metal contacts 910 of the accessory device 900 when the electronic device 950 is inserted in the accessory device 900. The first metal contacts 910 of the accessory device 900 are electrically coupled with a power source (not shown) disposed in an opening of the accessory device 900 in a manner previously described (see FIG. 4). Further, the first metal contacts 960 are electrically coupled with a battery disposed in the electronic device 950. In this manner, when the first metal contacts 960 of the electronic device 950 engage the first metal contacts 910 of the accessory device, the accessory device 900 is designed to supply power in the form of electrical current from the power source in the accessory device 900 to the battery of the electronic device 950 via the metal contacts of the respective devices.

It will be appreciated that the first metal contacts 910 may be disposed anywhere along the base portion 916, and may include any number of metal contacts. Typically, the first metal contacts 910 may be include a corresponding number of metal contacts as the number of the first metal contacts 960 of the electronic device 950. Also, the first metal contacts 910 be disposed at a corresponding location as the first metal contacts 960 of the electronic device 950. Also, any one or more of the first metal contacts 910 of the accessory device 900 may be designed to transmit other electrical signals, such as data transmission, to a corresponding metal contact (or contacts) of the first metal contacts 960, with those metal contacts of the first metal contacts 960 designed to receive the data transmission. Data transmission may include, for example, media files (audio, video) transmitted from another electronic device (not shown).

The accessory device 900 may include second metal contacts 920 on a sidewall 912 of the accessory device 900. Also, the electronic device 950 may include second metal contacts 970 on a sidewall 972 of the electronic device, and designed to engage the second metal contacts 920 of the accessory device 900 when the electronic device 950 is inserted in the accessory device 900. Accordingly, the second metal contacts 920 may be include a corresponding number and be disposed at a corresponding location as the second metal contacts 970 of the electronic device 950. The second metal contacts 920 may be designed to provide the same function (or functions) as that of the first metal contacts 910. Also, in some embodiments, the accessory device 900 includes the first metal contacts 910 only at the base portion 916. In other embodiments, the accessory device 900 includes the first metal contacts 910 only at the sidewall 912, or any of the sidewalls of the accessory device 900.

Also, the accessory device 900 may include any embodiment of a hinge feature 906 similar to those previously described, such as a hinge feature 106 (shown in FIG. 1). This allows the accessory device 900 suitable for use with an extraction (or insertion) of the electronic device 950 in a manner similar to that shown in FIGS. 8-11. Also, the accessory device 900 may be formed by and may include any means previously described to facility actuating or pivoting a first region 902 of the accessory device 900 with the respect to a second region 904 of the accessory device 900.

Figure 22:
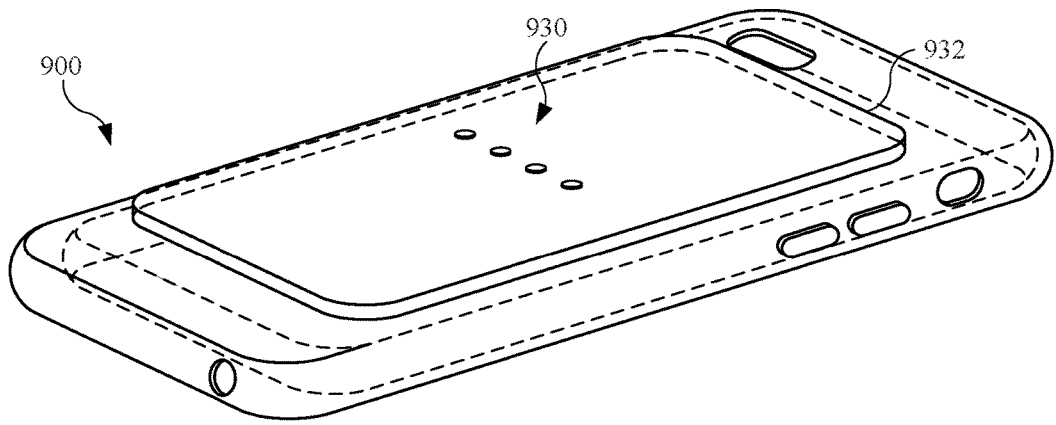
FIG. 22 illustrates an isometric rear view of the accessory device shown in FIG. 21.

FIG. 22 illustrates an isometric rear view of the accessory device 900 shown in FIG. 21. As shown, the accessory device 900 include third metal contacts 930 electrically coupled with a power source disposed in the accessory device 900, and designed to engage and electrically couple with a charging station (not shown). The charging station may deliver power in the form of electrical current to the power source, via the third metal contacts 930, in order to charge the power source. In some embodiments, at least some of the third metal contacts 930 are designed to receive data transmission which may be passed to the electronic device 950 (shown in FIG. 21) via the metal contacts (shown in FIG. 21) of the accessory device 900 engaged with the metal contacts of the electronic device 950. Further, the third metal contacts 930 may be located anywhere along the rear portion 932 and may include any number of metal contacts.

Figure 23:
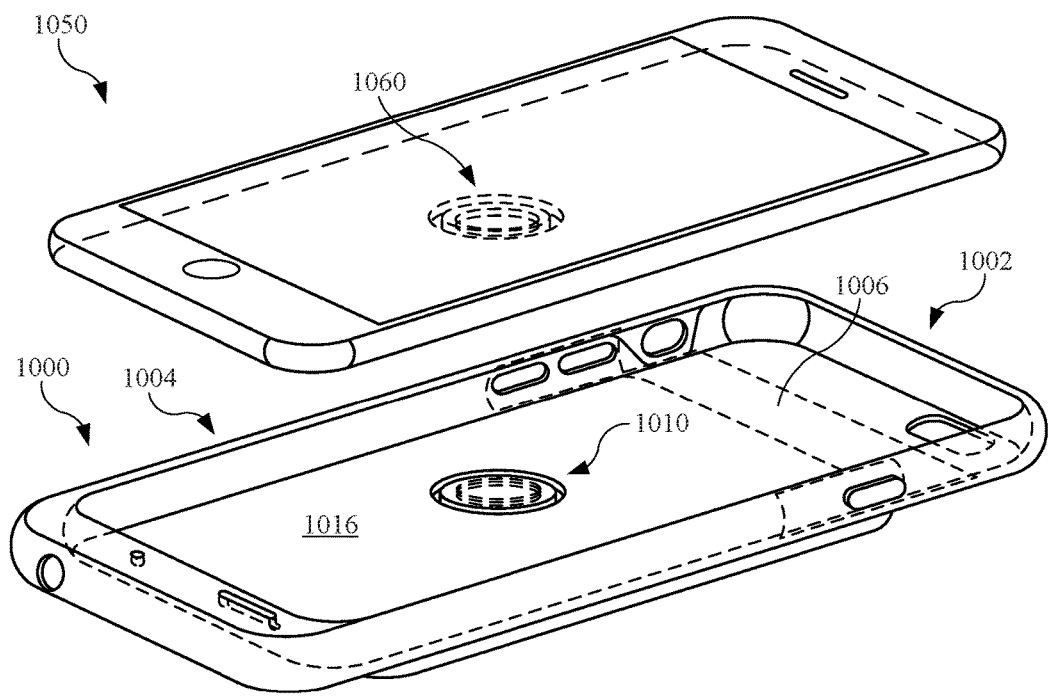
FIG. 23 illustrates an isometric view of an alternate embodiment of an electronic device and accessory device suitable for use with charging the electronic device, in accordance with the described embodiments.

FIG. 23 illustrates an isometric view of an alternate embodiment of an electronic device 1050 and accessory device 1000 suitable for use with charging the electronic device 1050, in accordance with the described embodiments. The accessory device 1000 and the electronic device 1050 may combine to form a charging system, such as an inductive charging system. As shown, the accessory device 1000 may include a first coil feature 1010 located on a base portion 1016, and the electronic device 1050 may include a second coil feature 1060. The first coil feature 1010 and the second coil feature 1060 may each include a wire would several times around, for example, a metal core feature. In this manner, when the electronic device 1050 is disposed in the accessory device 1000, the first coil feature 1010 and the second coil feature 1060 may combine to form part of an inductive charging system designed to supply power in the form of electrical current from a power source in the accessory device 1000 to a battery disposed in the electronic device 1050. Further, the first coil feature 1010 may receive electrical current form an external source (such as an electrical outlet) and transfer at least some of the electrical current to the second coil feature 1060, which may provide an electrical current used to charge battery in the electronic device 1050. The metals cores, one of which is disposed in the accessory device 100 and wound by the first coil feature 1010, and the other disposed in the electronic device 1050 and wound by the second coil feature 1060, may provide a means for transferring the electrical current from the first coil feature 1010 to the second coil feature 1060.

Also, the accessory device 1000 may include any embodiment of a hinge feature 1006 previously described, such as a hinge feature 106 (shown in FIG. 1). This allows the accessory device 1000 suitable for use with an extraction (or insertion) of the electronic device 1050 in a manner similar to that shown in FIGS. 8-11. Also, the accessory device 1000 may be formed by and may include any means previously described to facility actuating or pivoting a first region 1002 of the accessory device 1000 with the respect to a second region 1004 of the accessory device 1000.

Figure 24:
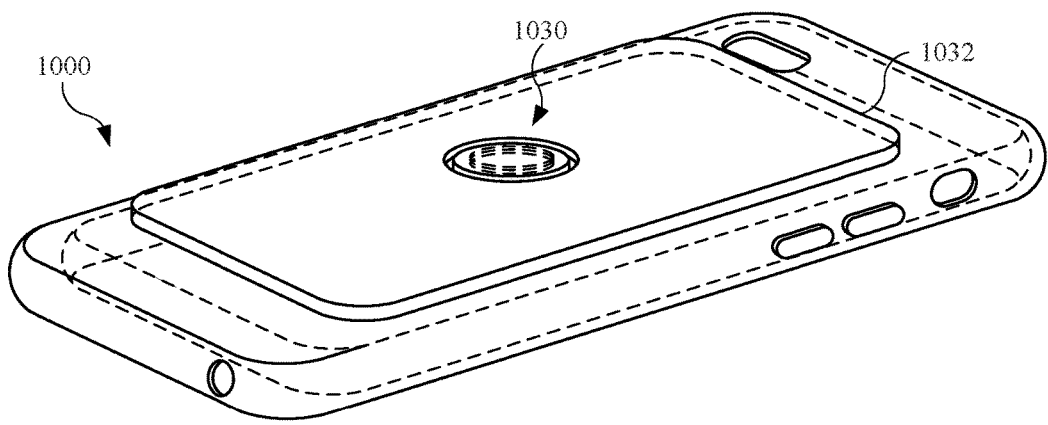
FIG. 24 illustrates an isometric rear view of the accessory device shown in FIG. 23.

FIG. 24 illustrates an isometric rear view of the accessory device shown in FIG. 23. As shown, the accessory device 1000 may include a third coil feature 1030 disposed on a rear portion 1032 of the accessory device 1000 and electrically coupled with a power source disposed in the accessory device 1000. The third coil feature 1030 may include a wire would several times around a metal core feature. Also, the third coil feature 1030 is designed to pair with an additional coil feature and metal core (not shown) used to form an inductive charging station that provides power in the form of electrical current in order to charge the power source disposed in the accessory device 1000.

Other means for charging a power source in an accessory device may be used. For example, the charging means for the power source may include a photovoltaic (solar) panel, or panels, disposed on the accessory device designed transform light energy into electrical energy, with the electrical energy stored in the power source of the accessory device. Also, the accessory device may be designed to receive infrared light in order to charge the power source of the accessory device by infrared means.

Figure 25:
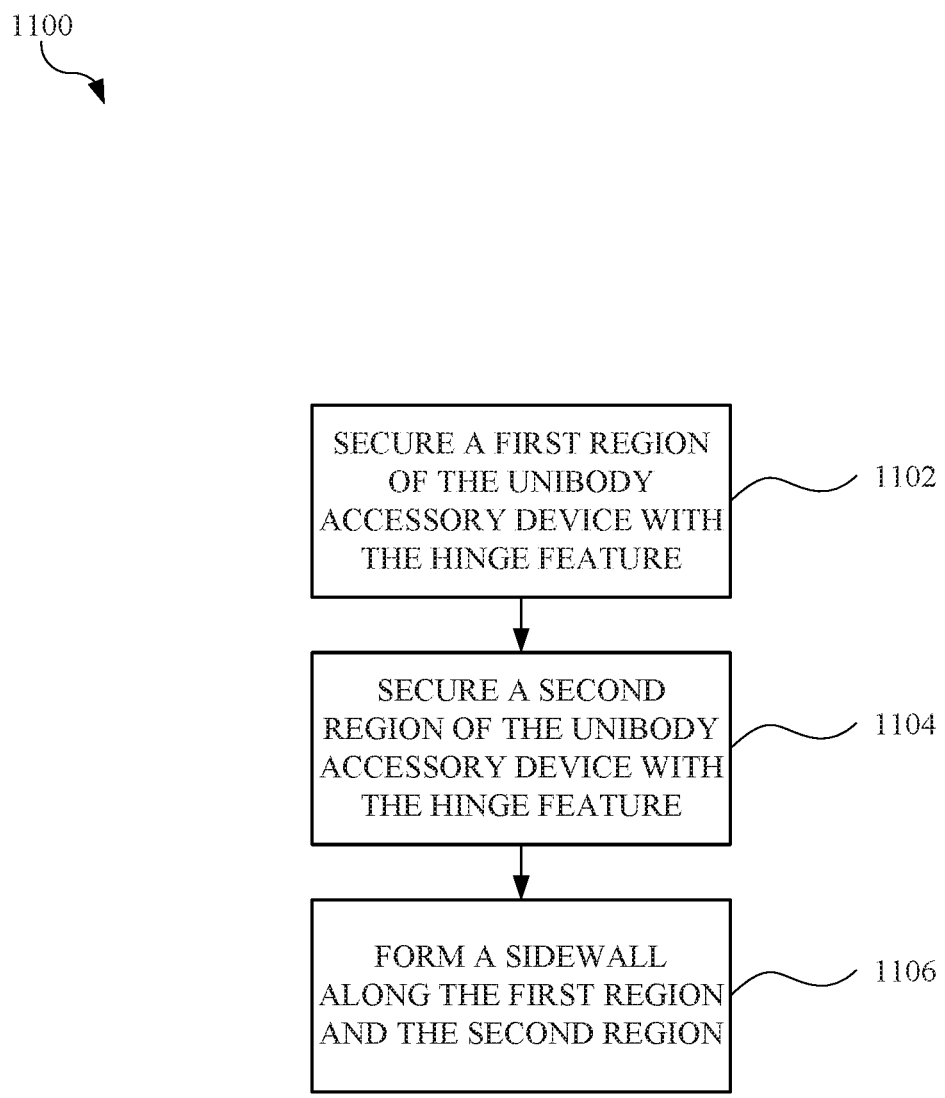
FIG. 25 illustrates a flowchart showing a method for forming a unibody accessory device having a hinge feature that facilitates an insertion event and an extraction event of an electronic device.

FIG. 25 illustrates a flowchart 1100 showing a method for forming a unibody accessory device having a hinge feature that facilitates an insertion event and an extraction event of an electronic device, in accordance with the described embodiments. The hinge feature may include an elastomeric material designed to allow a region of the accessory device to pivot or bend with respect to another region of the accessory device. However, in other embodiments, the hinge feature is formed from metal or plastic.

In step 1102, a first region of the unibody accessory device is secured with the hinge feature. In step 1104, a second region of the unibody accessory device with the hinge feature. The first region and the second region may combine to define a receptacle region designed to carry the electronic device. Also, the hinge feature allows the first region to pivot at the hinge feature and bend with respect to the second region.

In step 1106, a sidewall along the first region and the second region is formed. The sidewall may include one or more materials selected from a rigid thermoplastic, a material defining the hinge feature, and a silicone layer over molded to the rigid thermoplastic. In some embodiments, a force applied to the first region pivots the first region at the hinge feature and bends the sidewall at the hinge feature to allow the insertion event or the extraction event.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An accessory device suitable for use with an electronic device having an electrical device contact, the accessory device comprising:
  a unitary structure comprising a base wall and sidewalls that combine with the base wall to define a receptacle having a size and shape to receive the electronic device, the unitary structure further including a compartment that is at least partially covered by the base wall;
  a battery disposed in the compartment;
  a hinge feature embedded in the unitary structure and hidden from view by at least the base wall and the sidewalls, the hinge feature allowing the unitary structure to bend and receive the electronic device; and
  an accessory contact positioned on the unitary structure and electrically coupled to the battery, the accessory contact configured to electrically couple with the electrical device contact and channel power from the battery to the electronic device when the electronic device is positioned in the receptacle.

2. The accessory device of claim 1, wherein the sidewalls comprise:
  a first sidewall; and
  a second sidewall that combines with the first sidewall to retain the electronic device, wherein the hinge feature extends from the first sidewall to the second sidewall.

3. The accessory device of claim 2, further comprising:
  a third sidewall; and
  a fourth sidewall, wherein the first sidewall, the second sidewall, the third sidewall, and the fourth sidewall define continuous wall that extends from the base wall.

4. The accessory device of claim 2, wherein the unitary structure comprises:
  a first region; and
  a second region separated from the first region by the hinge feature, wherein a force applied to the first region causes the first region to pivot at the hinge feature and allow the electronic device to slide between the first sidewall and the second sidewall in a direction parallel to the hinge feature.

5. The accessory device of claim 2, wherein the accessory contact is located on the first sidewall.

6. The accessory device of claim 1, wherein the accessory contact is located on the base wall.

7. The accessory device of claim 1, wherein the accessory contact is a first accessory contact, and wherein the accessory device further comprises a second accessory contact located on a rear portion that at least partially defines the compartment.

8. An accessory device, comprising:
a unitary structure that defines a receptacle that receives an electronic device, the receptacle having a first region and a second region separate from the first region;
a hinge feature connected to the first region and the second region, the hinge feature comprising a material that is covered and hidden from view by the unitary structure, the hinge feature allowing the first region to rotate relative to the second region; and
a coil feature embedded in the unitary structure, the coil feature configured to inductively charge a battery of the electronic device when the electronic device is positioned in the receptacle.

9. The accessory device of claim 8, wherein the unitary structure bends at the hinge feature in response to an applied force to define a bent configuration of the unitary structure, the bent configuration allowing the electronic device to be 1) inserted into the receptacle in a first direction, and 2) extracted from the receptacle in a second direction opposite the first direction.

10. The accessory device of claim 8, wherein the unitary structure comprises:
a first sidewall;
a second sidewall; and
a base wall separating the first sidewall from the second sidewall, wherein the material comprises an elastomer that continuously extends into the first sidewall, the second sidewall, and the base wall.

11. The accessory device of claim 10, wherein the unitary structure includes a compartment that carries a power source electrically coupled to the coil feature.

12. The accessory device of claim 11, wherein the coil feature defines a first coil feature covered by the base wall, and wherein the accessory device further comprises a second coil feature covered by the compartment.

13. A method for assembling an accessory device suitable for use with an electronic device, the electronic device having an electrical device contact located on a wall, the method comprising:
providing a unitary structure that includes a base wall and sidewalls that combine with the base wall to define a receptacle that includes a size and shape to receive the electronic device, the unitary structure further including a compartment that is at least partially covered by the base wall, wherein the sidewalls comprise a first sidewall, a second sidewall, a third sidewall, and a fourth sidewall, wherein the first sidewall, the second sidewall, the third sidewall, and the fourth sidewall define a single continuous wall that extends from the base wall;
disposing a battery in the compartment;
embedding a hinge feature in the unitary structure such that the hinge feature is covered by the base wall and the sidewalls, the hinge feature allowing the unitary structure to bend and receive the electronic device; and
positioning an accessory contact on the unitary structure and electrically coupled to the battery, the accessory contact configured to electrically couple with the electrical device contact and power the electronic device when the electronic device is positioned in the receptacle.

14. The method of claim 13, wherein providing the hinge feature comprises extending the hinge feature into the first sidewall and into the second sidewall.

15. The method of claim 14, wherein providing the hinge feature comprises providing an elastomer.

16. The method of claim 14, wherein the accessory contact is a first accessory contact, and wherein the method further comprises positioning a second accessory contact located on a rear portion that at least partially defines the compartment.

17. The accessory device of claim 8, wherein the unitary structure comprises:
a base wall that covers the hinge features and the coil feature; and
sidewalls extending the base wall, wherein the sidewalls define a continuous ring.

18. The accessory device of claim 17, wherein the continuous ring comprises:
a first sidewall;
a second sidewall;
a third sidewall; and
a fourth sidewall.

19. The accessory device of claim 1, wherein the sidewalls comprise a first sidewall, a second sidewall, a third sidewall, and a fourth sidewall, wherein the first sidewall, the second sidewall, the third sidewall, and the fourth sidewall define a single continuous ring that extends from the base wall.

20. The accessory device of claim 1, wherein the unitary structure comprises a first region and a second region, and wherein the hinge feature comprises an elastomeric material that is between the first region and the second region.

* * * * *